United States Patent [19]

van der Lely

[11] 3,927,888

[45] Dec. 23, 1975

[54] RECORD PLAYER

[75] Inventor: Piet van der Lely, Eindhoven, Netherlands

[73] Assignee: U.S. Philips Corporation, New York, N.Y.

[22] Filed: Apr. 26, 1974

[21] Appl. No.: 465,167

[30] Foreign Application Priority Data

May 5, 1973 Netherlands ........................ 7306304

[52] U.S. Cl. .................................. 274/39 A; 248/21

[51] Int. Cl.$^{2}$ ............................................ G11B 3/60

[58] Field of Search .................... 248/20, 21; 274/39

[56] References Cited

UNITED STATES PATENTS

| | | | |
|---|---|---|---|
| 2,144,566 | 1/1939 | Dreisbach | 248/20 |
| 2,717,134 | 9/1955 | Ferber | 248/20 |
| 2,932,482 | 4/1960 | Dickie | 248/358 |
| 3,419,238 | 12/1968 | Flory | 248/20 |

FOREIGN PATENTS OR APPLICATIONS

| | | | |
|---|---|---|---|
| 872,594 | 7/1961 | United Kingdom | 248/20 |

*Primary Examiner*—Richard E. Aegerter
*Assistant Examiner*—John W. Shepperd
*Attorney, Agent, or Firm*—Frank R. Trifari; David R. Treacy

[57] ABSTRACT

Record player having a main frame and a sub-frame, movably connected to the main frame, carrying the turntable and tone-arm suspension. The main frame and the sub-frame are additionally joined by a double parallelogram linkage which permits translatory movements of the sub-frame but prevents rotary movements with respect to the frame.

5 Claims, 3 Drawing Figures

RECORD PLAYER

The invention relates to a record player comprising a main frame and a sub-frame which is movably connected to the main frame and carries the turn-table spindle and the tone-arm suspension with the tone arm.

Record players of the abovedescribed kind are known. A problem which arises with these known record players is that the stylus may be caused to jump from the groove of a record owing to movement of the spring-mounted sub-frame.

It is an object of the present invention to obviate this problem. According to the invention a record player has the main frame and the sub-frame joined to one another by a system which permits translatory movements of the subframe but prevents rotary movements thereof in the event of shocks exerted on the sub-frame in planes parallel to the turntable.

Because rotary motion of the sub-frame can in principle give rise to lateral movement of the tip of the stylus and consequent groove jumping, in a record player according to the invention in which translatory motion only of the sub-frame is allowed the groove jumping tendency is eliminated or at least considerably reduced. The steps according to the invention have maximum effect in conjunction with counter balanced tone arms.

In a preferred embodiment of the invention the joining system comprises a joining body, a first pair of joining elements each of which is pivotally connected at one end to the main frame and at the other end to the joining body, and a second pair of joining elements each of which is pivotally connected at one end to the sub-frame and at the other end to the joining body, the four pivot points of each pair of joining elements forming the vertices of a parallelogram.

Preferably the location of the four pivot points on the joining body is such that a line through the two pivot points of a joining element of one pair is substantially at right angles to a line through the two pivot points of a joining element of the other pair.

In a further preferred embodiment of the invention the joining body is a plate and the joining elements are strips, and the joining system which comprises the plate and the strips extends substantially parallel to the plane of the turntable, while the pivot axes are at right angles to this plane.

A record player according to the invention preferably includes means for eliminating backlash in the pivots. For example in each pair of joining elements a tension spring may be connected at one end to one element and at the other end to the other element of the pair.

Figure 1:
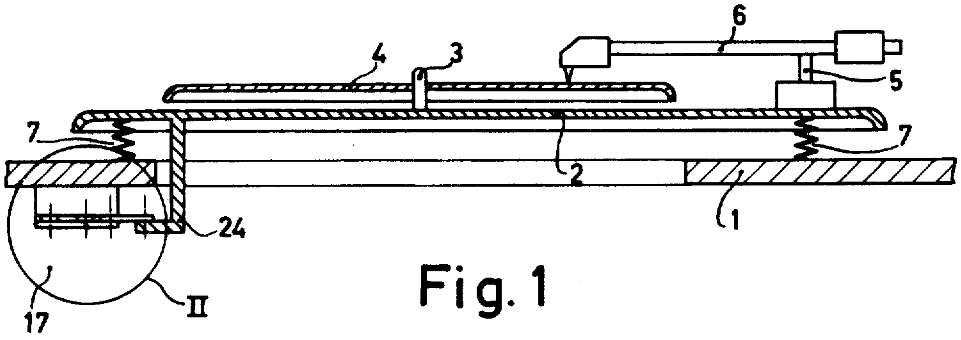
Figure 2:
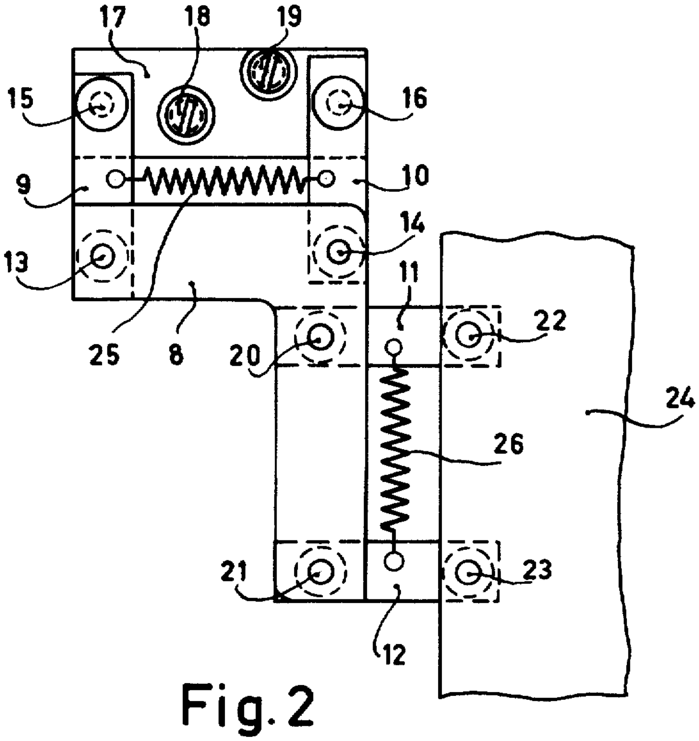
Figure 3:
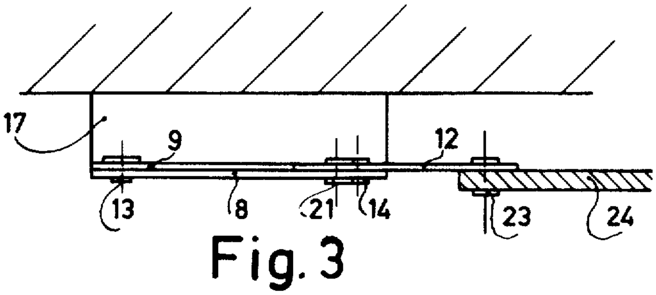

An embodiment of the invention will now be described by way of example with reference to the accompanying diagrammatic drawings, in which FIG. 1 is a schematic sectional view of a record player having a joining system according to the invention provided between the main frame and the sub-frame, FIG. 2 is a bottom plan view at an enlarged scale of the joining system, and FIG. 3 is a side sectional view at an enlarged scale of the joining system.

Referring now to FIG. 1, a record player comprises a main frame 1 and a sub-frame 2 which carries the usual components such as a turntable spindle 3 with a turntable 4 and a tone-arm suspension 5 with a tone arm 6. In known manner the sub-frame 2 is connected to the main frame 1 movably and resiliently, in the embodiment shown by means of coiled springs 7. The main frame and the sub-frame are further jointed to one another by a system which is schematically indicated by II in FIG. 1 and is shown more fully to an enlarged scale in FIGS. 2 and 3 in bottom plan view and side elevation respectively.

The joining system comprises a joining body in the form of an L-shaped plate 8, a first pair of joining strips 9 and 10 and a second pair of joining strips 11 and 12. The strips 9 and 10 each are pivotally connected at 13 and 14 respectively to the plate 8 and at the other end at points 15 and 16 to a block member 17 which is rigidly secured to the main frame 1 by means of screws 18 and 19. The strips 11 and 12 each at one end are pivotally connected to the plate 8 at the points 20 and 21 respectively and at the other end to an extension 24 of the sub-frame 2 at the points 22 and 23 respectively. The pour pivot points 13, 14, 15, 16 and 20, 21, 22, 23 respectively are located so as to form the verticles of a parallelogram.

The two imaginary lines joining the two pivot points 13 and 14 of one pair and 20 and 21 of the other pair are at an angle of the order of 70° to 110°, preferably at a right angle, to one another. The system comprising the L-shaped joining plate 8 and the pivot strips 9, 10, 11, 12 extends substantially parallel to the plane of the turntable 4, the pivot axes being at right angles to this plane.

A tension spring 25 is tensioned between the strips 9 and 10 to eliminate the backlash in the pivots 13, 14, 15 and 16. A similar spring 26 is tensioned between the strips 11 and 12.

The abovedescribed connection between the main frame and the sub-frame by means of two pivotally connected parallelogram constructions has the effect that, when the sub-frame is subjected to shocks in planes parallel to the turntable it can only perform translatory movements. Rotary movements of the sub-frame which may give rise to groove jumping of the stylus are prevented.

What is claimed is:

1. A record player comprising a main frame, a sub-frame movably connected to the main frame, a turntable mounted on the sub-frame for rotation about a first axis, a tone-arm, means for suspending the tone-arm with respect to the sub-frame, and means for preventing rotation of the sub-frame with respect to the frame about a second axis parallel to said first axis wherein said rotation preventing means comprises a joining body, a first pair of joining elements each having two ends, each pivotally connected about respective axes at one end to the main frame, each pivotally connected about respective axes at the other end to the joining body, and a second pair of joining elements each having two ends, each pivotally connected about respective axes at one end to the sub-frame, each pivotally connected about respective axes at the other end to the joining body, the pivot axes being parallel and the pivotal connections of the pairs of joining elements forming the vertices of respective parallelograms.

2. A record player as claimed in claim 1, wherein the pairs of joining elements are so arranged that, in a quiescent condition of the rotation preventing means, a line through the pivotal connections of a joining element of the first pair is substantially perpendicular to a line through the pivotal connections of a joining element of the second pair.

3. A record player as claimed in claim 1, wherein said turntable has a record-carrying surface defining a plane, said joining elements are formed as strips extending substantially parallel to said plane, and said pivot axes are parallel to said first axis.

4. A record player as claimed in claim 1, wherein said rotation preventing means further comprises means for eliminating backlash in the pivotal connections.

5. A record player as claimed in claim 4, wherein said backlash eliminating means comprises respective tension springs each interconnecting the joining elements of a pair.

* * * * *